(No Model.)

T. REDMOND.
DEVICE FOR PREVENTING HORSES FROM CRIBBING AND WIND SUCKING.

No. 526,538.　　　　　　　　　Patented Sept. 25, 1894.

Witnesses:
John L. Nolan
Fred. J. Pusey

Inventor:
Thomas Redmond
per Joshua Pusey
Attorney

UNITED STATES PATENT OFFICE.

THOMAS REDMOND, OF PHILADELPHIA, PENNSYLVANIA.

DEVICE FOR PREVENTING HORSES FROM CRIBBING AND WIND-SUCKING.

SPECIFICATION forming part of Letters Patent No. 526,538, dated September 25, 1894.

Application filed April 20, 1891. Serial No. 389,577. (No model.)

*To all whom it may concern:*

Be it known that I, THOMAS REDMOND, a citizen of the United States, residing in the city and county of Philadelphia, and State of Pennsylvania, have invented certain new and useful Improvements in Devices for Preventing Horses from Cribbing and Wind-Sucking, of which the following is a full, clear, and exact description, reference being had to the accompanying drawings, of which—

Figure 1:
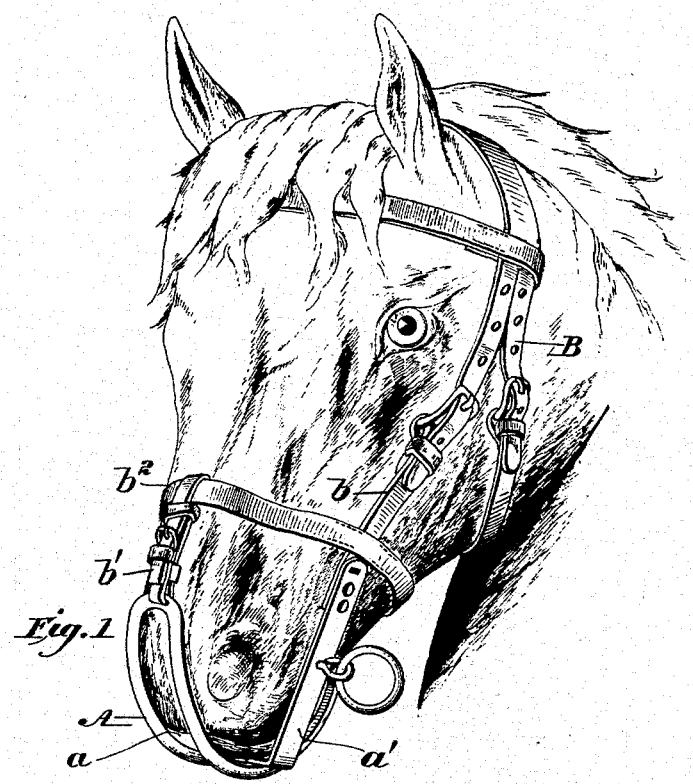
Figure 2:
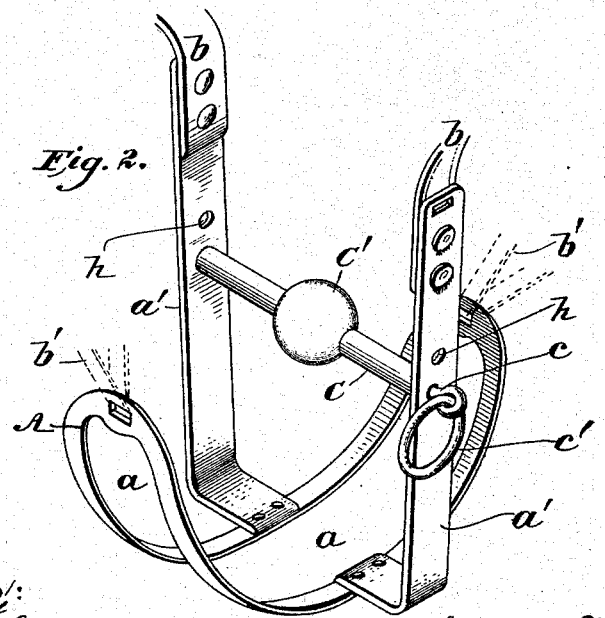
Figure 3:
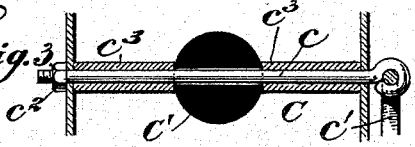

Figure 1 is a view of the device as applied to a horse's head. Fig. 2 is a perspective view of the device, the halter therefor not being shown. Fig. 3 is a transverse section through the bit and adjuncts.

The object of this invention is to provide a device in the nature of a muzzle, that will prevent and cure cribbing by horses, and also prevent what is known as wind-sucking; and it consists of a frame of wrought iron, or other suitable hard and rigid material, adapted to be applied so as to come immediately below the horse's mouth, and formed with an elongated opening, which, while permitting the horse to eat grass or other food, prevents his cribbing, by the sides of the open frame coming into contact with the feed-trough, or other surface which he would otherwise be liable to crib, and thereby his teeth cannot be brought into a biting contact with the trough, &c.

The invention also consists in the combination with the said frame, of a transverse bar or bit secured thereto, and provided with a ball or body of india-rubber or other suitable substance, whereby when the frame is applied to the horse's head so that the said bar is passed into his mouth, similarly to a bit, the ball or enlargement prevents wind-sucking, by rendering it impossible for the animal to form a vacuum or partial vacuum. Said bar is also preferably made detachable, so that the anti-cribbing device may be used alone.

The invention further consists in certain constructions which will be duly pointed out.

Referring to the drawings, A is a bar of iron (preferably galvanized) curved and formed as shown, so as to make an elongated slot $a$ of about two inches in width. On the sides near the middle of this frame are secured uprights or bars $a'$ opposite to each other, the distance between them being somewhat greater than the width of the jaw of a horse.

The device as described is adapted to be secured to a halter B in any convenient manner, preferably as shown, that is to say, by riveting the middle straps $b$ to the tops of the side bars $a'$, and providing adjusting straps $b'$ at each end of the frame A, which straps are connected to the halter strap $b^2$.

In applying the device, the halter is secured to the horse's head in the usual manner, the open frame A being brought underneath the nose of the animal and adjusted to come contiguous with the end of the nose, as illustrated.

It will be obvious that while the horse may readily eat and drink, and pasture, he cannot crib or bite his trough, fence rails, trees or the like, for the reason that, although the grass or other food may pass up into the slot $a$, the teeth of the animal are prevented by the frame A from taking hold of a solid or hard surface, such as a wooden trough or the like. At the same time no pain or inconvenience is inflicted.

The device is further useful in that it prevents a greedy horse from taking his food in large mouthfuls. It also prevents horses from wasting food by their throwing it out of the feed trough as many horses are known to do.

By upwardly curving the ends of the device A so that they project above the nose and chin of the animal, respectively, and by attaching these ends to the halter, as described, there is no liability of the device being displaced by the horse.

Some horses are merely "cribbers," others are only "wind-suckers," and others have both vices. I prevent the wind-sucking by placing between the side-bars $a'$ a bit bar C in the middle of which I secure a ball C' preferably of india-rubber. This bar is placed in the horse's mouth, as an ordinary bit, and while permitting the sides of the jaws to close or nearly so, the ball at the same time comes into contact with the roof of the animal's mouth, and thereby he is unable to form a vacuum or partial vacuum, and thus cannot suck wind. I prefer to construct this anti-wind-sucking device in the following manner: $c$ is a rod having a ring $c'$ upon one end, and a screw-nut $c^2$ on the other end to retain it in place. This rod passes through holes in the bars $a'$ and also through loose sleeves or rollers $c^3$ on each side of the ball, which latter is slid onto the said rod. The bit and its adjuncts may be readily removed at feeding time by taking off the nut and withdrawing the rod, and as readily replaced.

In order to adjust the location of the bit-bar, according to the length of the ordinary horse's mouth, I provide two or more holes $h$ opposite each other in the side bars, through which holes the rod $c$ may be passed as circumstances may require.

If a horse be not a wind-sucker, but only a cribber, the bar and ball device may be removed.

Having thus described my invention, I claim—

1. A device for preventing cribbing and wind sucking by horses, comprising a rigid open, or longitudinally slotted, U-shaped frame, vertical side bars secured to said frame, and a bit-bar supported between said side bars and provided with a centrally disposed anti-windsucking ball, substantially as described.

2. The combination of vertical side-bars and a rigid open or longitudinally slotted U-shaped frame secured to said bars, the up-curved ends of said bars being adapted to project forwardly above the nose and rearwardly above the chin of the animal, substantially as described.

3. The combination of vertical side bars, a rigid open or longitudinally slotted U-shaped frame secured thereto, the up-curved ends of said frame being adapted to project forwardly above the nose and rearwardly above the chin of the animal and being provided with straps adapted to be secured to the halter, substantially as described.

4. The combination with the rigid open or longitudinally slotted U-shaped frame, the vertical side bars secured thereto, a bit bar detachably secured to said supporting bars, and provided with a centrally disposed anti-windsucking ball, substantially as described.

In testimony whereof I have hereunto affixed my signature this 14th day of April, A. D. 1891.

THOMAS REDMOND.

Witnesses:
JOSHUA BUSEY,
GEO. W. REED.